United States Patent [19]
Park

[11] Patent Number: 5,140,428
[45] Date of Patent: Aug. 18, 1992

[54] LCD PROJECTOR COMBINED WITH A VIDEO PRINTER

[75] Inventor: Hong C. Park, Seoul, Rep. of Korea

[73] Assignee: Goldstar Co., Ltd., Seoul, Rep. of Korea

[21] Appl. No.: 460,624

[22] Filed: Jan. 3, 1990

[30] Foreign Application Priority Data

Jan. 31, 1989 [KR] Rep. of Korea .................. 1097/1989

[51] Int. Cl.$^5$ ............................................. H04N 5/84
[52] U.S. Cl. .................... 358/244; 358/230; 358/241
[58] Field of Search ............ 358/230, 241, 244, 244.1, 358/244.2, 332, 333, 335, 345, 346, 236

[56] References Cited

U.S. PATENT DOCUMENTS

| | | | |
|---|---|---|---|
| 4,191,962 | 3/1980 | Sramek | 346/110 R |
| 4,319,281 | 3/1982 | Gall et al. | 358/244 |
| 4,586,085 | 4/1986 | Haendle | 358/244 |
| 4,632,538 | 12/1986 | Lemelson et al. | 355/14 R |
| 4,752,806 | 6/1988 | Haas et al. | 355/3 R |
| 4,752,823 | 6/1988 | Takahashi et al. | 358/80 |
| 4,935,820 | 6/1990 | Patel et al. | 358/302 |

Primary Examiner—Donald McElheny, Jr.
Assistant Examiner—Jennifer L. Hazard

[57] ABSTRACT

A liquid crystal display projector combined with a video printer is capable of copying a desired picture being displayed on a screen as a photograph. The combination of a liquid crystal display projector and a video printer has a projection optical system including a concave mirror, an LCD panel, a projection lens, and a partial reflective mirror provided between the LCD panel and the projection lens. A copier optical system is also included which has a total reflective mirror, a copier lens, an LCD shutter, and photographic film on which an image signal passing through the partial reflective mirror is formed. A control circuit supplies a video drive signal to the LCD panel and a shutter output control signal to the LCD shutter when a copy selection signal is applied to the control circuit. Still picture data are outputted and applied through the LCD driver to the LCD panel so that the image passing through the copier lens is formed on the photographic film.

4 Claims, 3 Drawing Sheets

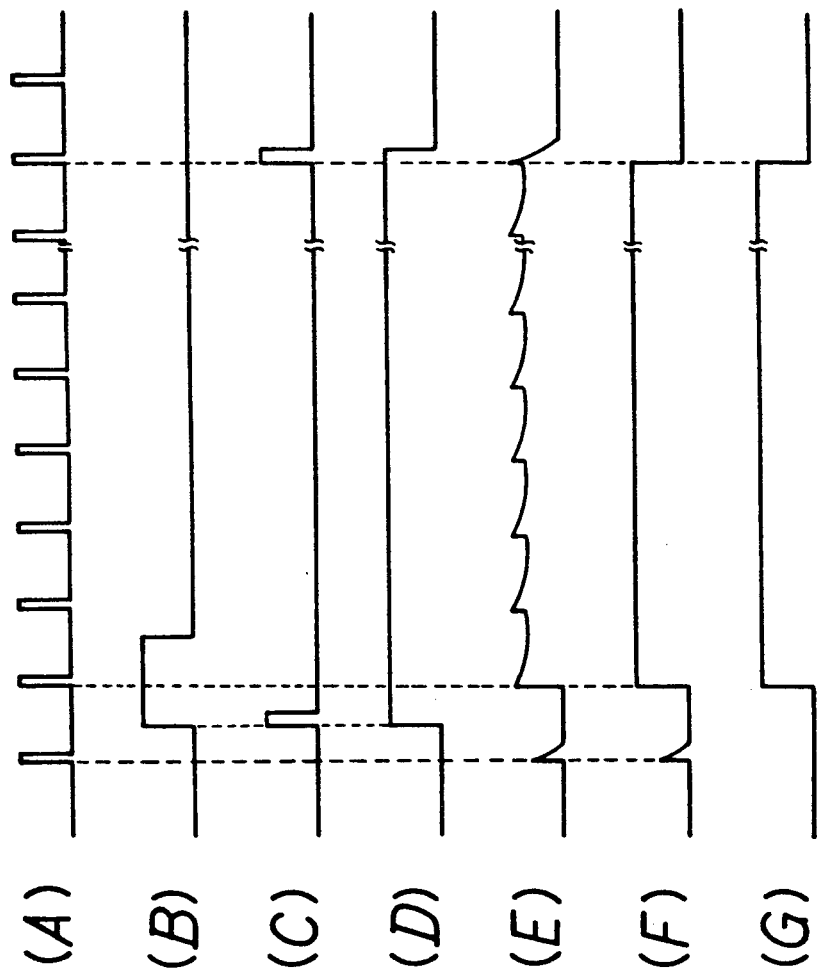

LCD PROJECTOR COMBINED WITH A VIDEO PRINTER

BACKGROUND OF THE INVENTION

The present invention relates to a combination of a liquid crystal display (hereinafter, referred to as an LCD) projector and a video printer and, more particularly, to an LCD projector in which a desired picture being displayed on a screen of LCD projector can be copied as a photograph.

Generally a LCD projector is constituted such that light from a light source is condensed by a focusing lens and projected on an LCD panel, a video image is produced by a video drive image being applied to the LCD panel, and the video signal is displayed on a screen through a projection lens.

Therefore, in such prior art LCD projectors, any additional function such as a photocopier function cannot be obtained with the exception of its own function, i.e., picture reproduction. For example, although a user needs to get a photocopy of a specific picture being displayed on a screen of the LCD projector, it has not been possible to carry out such a function in the conventional LCD projector.

SUMMARY OF THE INVENTION

Therefore, the object of the present invention is to provide an LCD projector combined with a video printer in which a specific picture among pictures being displayed on a screen of an LCD projector is selected by a user and copied as a photograph.

The above object of the present invention is obtained by a LCD projector having a partial reflective mirror which is provided between an LCD panel and a projection lens of a projection optical system. An image reflected from the partial reflective mirror is reflected again from a total reflective mirror and formed on a photographic film through a copier lens and an LCD shutter. When a copy selection signal is applied to a control circuit, still picture data are outputted from the control circuit for a predetermined time and applied to the LCD panel through an LCD driver so that still image signal is outputted from the LCD panel. At the same time shutter output control signal is outputted from the control circuit for a predetermined time so that an image passing through the copier lens is formed on the photographs film through the LCD shutter.

BRIEF DESCRIPTION OF THE DRAWINGS

The above and other objects, features and advantages of the invention will be apparent from the following detailed description in conjunction with the accompanying drawings, in which:

FIGS. 3A to 3G are waveform views of each part of a shutter control unit of FIG. 2.

DETAILED DESCRIPTION OF THE INVENTION

Figure 1:
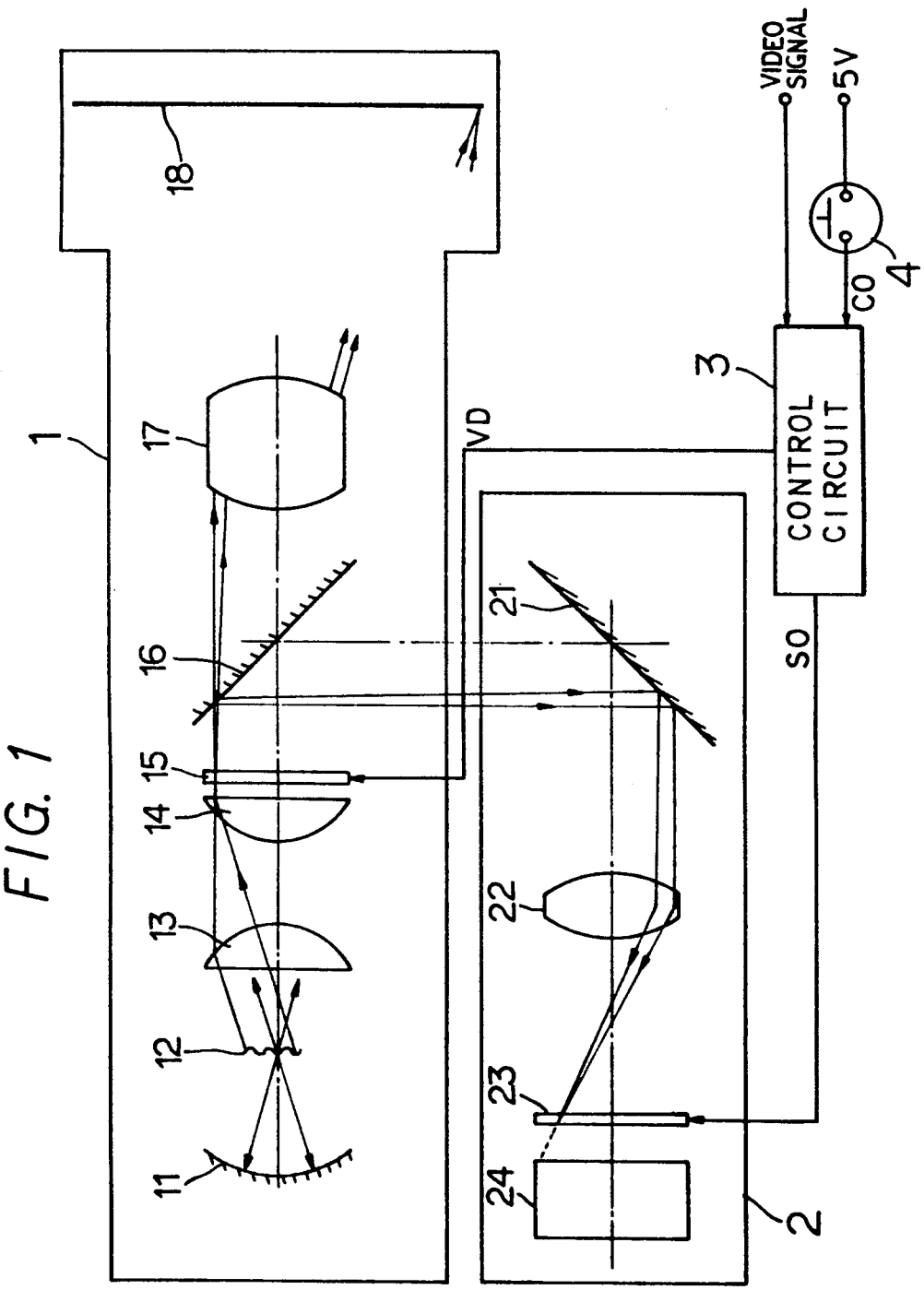
FIG. 1 is a block diagram showing an optical system of an LCD projector according to the present invention.

Referring to FIG. 1, in an LCD projector wherein light of a lamp 12 reflected from a concave mirror 11 is projected on an LCD panel 15 via focusing lenses 13 and 14, and a video drive signal VD is applied to the LCD panel 15 to form a picture thereon and formed on a screen 18 by a projection lens 17. The LCD projector of the present invention further comprises a copier optical system 2 in which the picture formed on the LCD panel 15 is partially reflected from the partial reflective mirror 16 and reflected again by a total reflective mirror 21. The reflected picture is formed on a photographic film 24 through an LCD shutter 23 after passing through a copier lens 22. A control circuit 3 receives a video signal and a copy selection signal CO of a copier switch 4 and supplies a video drive signal VD to the LCD panel 15 of the projection optical system 1 and a shutter output control signal SO to the LCD shutter 23 of the copier optical system 2.

Figure 2:
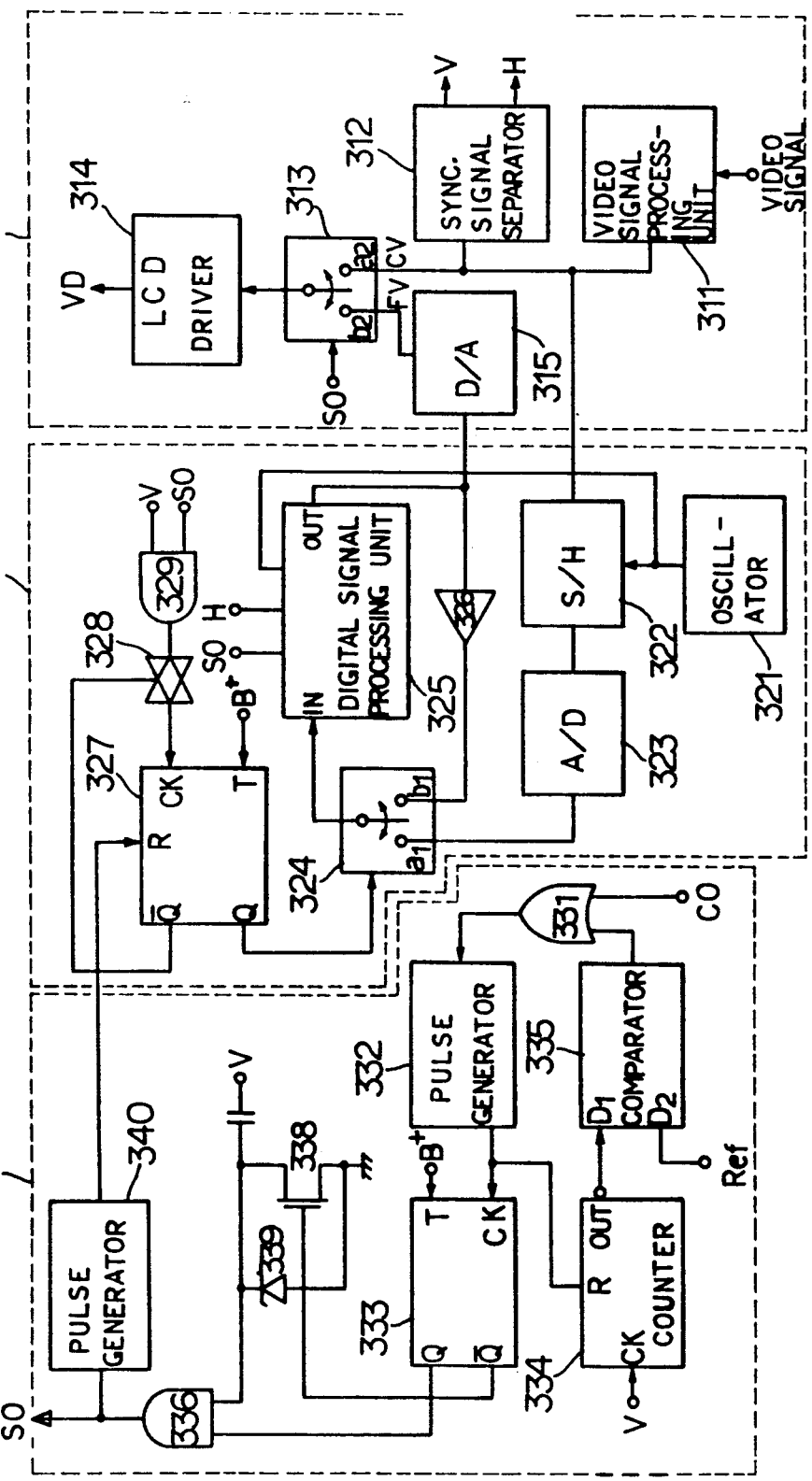
FIG. 2 is a detailed circuit diagram of a control circuit of FIG. 1.

Referring to FIG. 2, the control circuit 3 comprises a shutter control unit 33, a video freezing unit 32, and a signal processing unit 31.

The shutter control unit 33 is constituted such that a counting signal of a counter 334 which counts vertical synchronizing signals V is compared with a reference signal Ref in a comparator 335, and the output signals of the comparator 335 and a copy selection signal CO are applied to a first pulse generator 332 through an OR gate 331. The pulse signal of the first pulse generator 332 is applied to the counter 334 as a reset signal and applied to a first flip-flop 333 as a clock signal. The vertical synchronizing signal V is applied through a capacitor to a zener diode 339, a drain of a field effect transistor 338 and an input terminal of a first AND gate 336. The signal of an output terminal $\bar{Q}$ of the first flip-flop 333 is applied to a gate of the field effect transistor 338. The signal of output terminal Q of the first flip-flop 333 is applied to an input terminal of the first AND gate 336. A shutter output control signal SO is outputted from the first AND gate 336 and applied to a second pulse generator 340 and at the same time to an LCD shutter 23 of the copier optical system 2.

The video freezing unit 32 is constituted such that the pulse signal of the second pulse generator 340 is applied to a second flip-flop 327 as a reset signal. The vertical synchronizing signal V and shutter output control signal SO are applied through a second AND gate 329 to the second flip-flop 327 as clock signals after passing through a transmission gate 328 which is controlled by a signal of an output terminal $\bar{Q}$ of the second flip-flop 327. The output signal of a video signal processing unit 311 is sampled and held in a sample/hold unit 322 by an oscillation signal of an oscillator 321 and converter into a digital signal by an analog/digital converter 323 and then applied to an input terminal $a_1$ of a first change-over switch 324 which is controlled by the signal of an output terminal Q of the second flip-flop 327. The signal selected at the first change-over switch 324 is processed by a digital signal processing unit 325 which is enabled by the shutter output control signal SO, and then applied to another terminal $b_1$ of the first change-over switch 324 through a refresh amplifier 26.

The signal processing unit 31 is constituted such that vertical synchronizing signal V and horizontal synchronizing signal H among the output signals of the video signal processing unit 311 are separated by and outputted from a synchronizing separator 312. The output signal of the digital signal processing unit 325 is converted into an analog signal by a digital/analog converter 315. The output signal of the digital/analog converter 315 or the output signal of the video signal processing unit 311 is selected by a second change-over switch 313 which is controlled by the shutter output control signal SO, and then applied through an LCD driver 314 to an LCD panel 15 of the projection optical system 1 as a video drive signal VD.

In the above arrangement, the first and second flip-flops 333 and 327 are of the T-type that a high potential signal B+ is applied to their input terminals T and T.

FIGS. 3A to 3G are waveforms of each part of the shutter control unit 33 of FIG. 2.

Hereinafter, the operation and effect of the present invention will be described in more detail.

Explaining the function of the projection optical system 1 and the copier optical system 2, light of the lamp 12 reflected from the concave mirror 11 is condensed by the focusing lenses 13 and 14 and projected on the LCD panel 15. At this moment, a video drive signal VD is outputted from the control circuit 3 and applied to the LCD panel 15, thereby an image is formed on the LCD panel 15. The image is then projected on a screen 18 after passing through the partial reflective mirror 16 and projection screen 17.

At this moment, while the majority of the image of the LCD panel 15 is projected on the projection lens 17 through the partial reflective mirror 16, a part of the image is reflected by the partial reflective mirror 16 and reflected again by the total reflective mirror 21. The reflected image is formed on the photographic film 24 through the copier lens 22 and the LCD shutter 23. Viewing from the copier lens 22, the LCD panel 15 and the photographic film 24 are in a conjugate relation. The LCD shutter 23 permits light to pass therethrough only when a high potential shutter output control signal SO, is outputted from the control circuit 3 so that the photographic film 24 is exposed to the light.

The function of the projection optical system 1 and the control circuit 3 which controls the copier optical system 2 will now be described in detail.

When a video signal is applied to the video signal processing unit 311, the video signal is processed in the video signal unit 311 and applied to an input terminal $a_2$ of the first change-over switch 313 as a current video signal CV. The vertical synchronizing signal V and horizontal synchronizing signal H among the current video signal CV are separated and outputted from a synchronizing separator 312.

At this moment, when a high potential copy selection signal CO, as shown in FIG. 3B, is applied to a shutter control unit 33 of the control circuit 3, the copy selection signal CO is applied to the first pulse generator 332 through the OR gate 331, so that a pulse signal, as shown in FIG. 3C, is generated from the first pulse generator 332 and applied to a reset terminal R of the counter 334 and a clock terminal CK of the first flip-flop 333. Therefore, the counter 334 becomes to reset and starts to count the vertical synchronizing signal V.

In addition, a high potential signal, as shown in FIG. 3D, is outputted from an output terminal Q of the first flip-flop 333 and applied to an input terminal of the first AND gate 336. A low potential signal is outputted from another output terminal $\overline{Q}$ of the first flip-flop 333 and applied to a gate of the field effect transistor 338. Therefore, the field effect transistor 338 is turned off and the resistance between the drain and the source becomes larger.

In this state, when a vertical synchronizing signal, as shown in FIG. 3A, is outputted from the synchonizing separator 312, the vertical synchronizing signal has a ripple as shown in FIG. 3E, having a time constant of the field effect transistor 338 and the capacitor 337. However, it is converted into the waveform as shown in FIG. 3F by the voltage regulating operation of the zener diode 339 and applied to an input terminal of the first AND gate 336. The vertical synchronizing signal V, which is outputted from the synchronizing separator 312, is shaped by the zener diode 339 after passing through the capacitor 337 and applied to an input terminal of the first AND gate 336.

And, at this time, to the other input terminal of the AND gate 336 is applied the high potential signal, as shown in FIG. 3D, which is outputted from the output terminal Q of the first flip-flop 333, so that a high potential shutter output control signal SO, as shown in FIG. 3G, is outputted from the output terminal of the first AND gate 336 and applied to an LCD shutter 23 of the copier optical system 2.

On the other hand, the vertical synchronizing signal V is inputted to the counter 334 and counted therein. The counted signal of the counter 334 is applied to an input terminal $D_1$ of the comparator 335, when the counted signal becomes identical to a reference signal Ref which is the data of a proper exposing time. A high potential signal is outputted from the comparator 335. Since the high potential signal is applied to the first pulse generator 332 through the OR gate 331, the pulse signal, as shown in FIG. 3C, is outputted from the first pulse generator 332 and applied to the reset terminal R of the counter 334 and the clock terminal CK of the first flip-flop 333. Accordingly, the counter 334 is reset and the output signal of the first flip-flop 333 is inverted. Therefore, a low potential signal, as shown in FIG. 3D, is outputted from the output terminal Q of the first flip-flop 333 and a high potential signal is outputted from the output terminal $\overline{Q}$ thereof. Since the high potential signal from the output terminal $\overline{Q}$ turns the field effect transistor 338 on, to one input terminal of the first AND gate 336 is applied a ground potential and to the other input terminal thereof is applied the low potential signal being outputted from the output terminal Q of the first flip-flop 333. Therefore, from an output terminal of the first AND gate 336 a low potential signal, as shown in FIG. 3G, is outputted and the high potential shutter output control signal SO is not outputted therefrom. As a result, the copy selection signal CO is applied to the shutter control unit 33. A high potential shutter output control signal SO is outputted to regulate the exposing time of the LCD shutter 23 until the vertical synchronizing signal V is applied at the predetermined times corresponding to the reference signal Ref.

On the other hand, the current video signal CV being outputted from the video signal processing unit 311 is sampled and held in the sample/hold unit 322 by the oscillation signal of the oscillator 321 and converted into a digital signal in the analog/digital converter 323 and then applied to a terminal of the first change-over switch 324. The digital signal processing unit 325 is a memory device for storing the digital image signal of one field or one frame, and the output signal of the digital signal processing unit 325 is applied to the other terminal $b_1$ of the first change-over switch 324 through a refresh amplifier 326 for compensating the irregularity of the level of the output signal.

On the other hand, when the high potential shutter output control signal SO is outputted, since a pulse signal is outputted from the second pulse generator 340 and the pulse signal is applied to a reset terminal R of the second flip-flop 327, the second flip-flop 327 is reset and thus, a low potential signal is outputted from the output terminal Q and a high potential signal is outputted from the other terminal $\overline{Q}$ of the second flip-flop 327. Thus the low potential signal being outputted from the output terminal Q of the second flip-flop 327 is applied to a control terminal of the first chang-over switch 324. As a result, the switch 324 is short-circuited to its terminal $a_1$. Consequently, the signal which is outputted from the analog/digital converter 323 and applied to one terminal of the switch 324, is applied to and processed in the digital signal processing unit 325, and then applied to the other terminal $b_1$ of the first change-over switch 324 through the refresh amplifier 326.

Furthermore, the high potential signal, which is outputted from the output terminal $\overline{Q}$ of the second flip-flop 327, is applied to a control terminal of the transmission gate 328, and thus, the transmission gate 328 becomes conductive. At this moment, the high potential shutter output control signal SO is applied to one side input terminal of the first AND gate 329. Thereafter when the first vertical synchronizing signal V is applied, it is applied to a clock terminal CK of the second flip-flop 327 through the second AND gate 329 and the transmission gate 328. Thus the output signal of the second flip-flop 327 is inverted and a low potential signal is outputted from the output terminal $\overline{Q}$ and a high potential signal is outputted from the output terminal Q thereof.

The high potential signal being outputted from the output terminal $\overline{Q}$ of the second flip-flop 327 is applied to a control terminal of the transmission gate 327, cut-off the transmission gate 327, thereby no further pulse signal is applied to the clock terminal CK of the second flip-flop 327. At this moment, since the high potential signal being outputted from the output terminal Q of the second flip-flop 327 is applied to a control terminal of the first change-over switch 324, the switch 324 is short-circuited to its terminal $b_1$ and the output signal of the refresh amplifier 326, which is applied to the terminal $b_1$ of the first switch 324, is applied to the digital signal unit 325.

Consequently, at the first field after a high potential shutter output control signal SO is outputted from the shutter control unit 33, a digital signal which is outputted from the analog/digital converter 323, is inputted to and stored in the digital signal processing unit 325. From the next field, the output signal is re-inputted to the digital signal processing unit 325 at the same time as the output of the digital signal processing unit 325. Thus, video signal data of the same picture are outputted from the digital signal processing unit 325, and then converted into an analog signal in the digital/analog converter 315 and applied to the other terminal $b_2$ of the second change-over switch 313 as a frozen video signal FV.

Furthermore, under the state that a high potential shutter output control signal SO is outputted from the shutter control unit 33 as above, the second change-over switch 313 is short-circuited to its terminal $b_2$. Since the frozen video signal FV is inputted to the LCD panel 15 of the projection optical system 1 through the LCD driver 314 as a video drive signal VD a still picture is produced on the LCD panel 15. This frozen picture, that is, a still picture, is displayed on the screen 18 through the partial reflective mirror 16 and the projection lens 17 and reflected from the partial reflective mirror 16 and the total reflective mirror 12, thereafter applied to the photographic film 24 through the copier lens 22 and LCD shutter 23 to carry out the copier function.

On the other hand, under the state that a high potential output control signal SO is not outputted from the shutter control unit 33 the second change-over switch 313 is short-circuited to its terminal $a_2$. Thus, the current video signal CV being applied to the terminal $a_2$ of the second change-over switch 313 is applied to the LCD panel 15 of the projection optical system 1 as a video drive signal VD through the LCD driver 314 so that a picture corresponding to the current video signal VD is produced on the LCD panel 15 and the picture is displayed on the screen 18 through the partial reflective mirror 16 and the projection lens 17.

At this moment, hewever, since a high potential shutter output control signal SO is not being outputted, the LCD shutter 23 is in a cut-off state thereby the copier function is not carried out.

What is claimed is:

1. A liquid crystal display projector combined with a video printer, comprising:

a projection optical system for projecting light onto a liquid crystal display panel to render a picture on the liquid crystal display panel, the picture being displayed on a screen;

a copier optical system for forming an image from a partial reflection of the light utilized to render the picture on the liquid crystal display panel on a photographic film; and control means for generating a video drive signal when a video image is to be formed and for generating a shutter output control signal for a predetermined time when a copy is to be generated;

said control means including, a shutter control unit which outputs a high potential shutter output control signal until a vertical synchronizing signal is inputted during a predetermined time after a copy selection signal is inputted, video freezing means for continuously outputting still picture data in response to said shutter output control signal, and signal processing means for selecting either the still picture signal outputted from said video freezing means and converting the still picture signal to an analog signal or an output signal from a video signal processing unit in response to said high potential shutter output control signal and for outputting the video drive signal according to the selected signal.

2. The liquid crystal display projector combined with a video printer as claimed in claim 1, wherein said shutter control unit comprises:

a counter for counting said vertical synchronizing signal;

a comparator;

a first pulse generator; and a first flip-flop.

3. The liquid crystal display projector combined with a video printer as claimed in claim 1, wherein said video freezing means comprises:

a second pulse generator for generating a pulse signal when said high potential shutter output control signal is outputted;

a second flip-flop;

a sample/hold unit;

an oscillator; and a refresh amplifier.

4. The liquid crystal display projector combined with a video printer as claimed in claim 1, wherein said signal processing means separates vertical synchronizing signal and horizontal synchronizing signal from among the output signals of the video signal processing unit, the still picture data of said video freezing means is converted into an analog signal and is selected to be applied to the liquid crystal display panel as a video drive signal.

* * * * *